United States Patent [19]

Melby et al.

[11] 4,188,467
[45] Feb. 12, 1980

[54] PROCESS FOR TEMPERING TISSUE FOR HEPARIN PRODUCTION

[75] Inventors: William E. Melby; Charles E. Isdale, Sr.; Vernon K. Collins, all of Champaign, Ill.

[73] Assignee: A. H. Robins Company, Incorporated, Richmond, Va.

[21] Appl. No.: 893,652

[22] Filed: Apr. 5, 1978

Related U.S. Application Data

[63] Continuation-in-part of Ser. No. 743,373, Nov. 19, 1976, abandoned, which is a continuation-in-part of Ser. No. 627,807, Oct. 31, 1975, abandoned.

[51] Int. Cl.² .................... C12B 1/00; C08B 37/10
[52] U.S. Cl. ................................ 435/274; 435/84; 536/21
[58] Field of Search .............. 195/2, 7, 4; 536/21

[56] References Cited

U.S. PATENT DOCUMENTS

| 2,410,084 | 10/1946 | Kuizenga | 195/7 |
| 2,884,358 | 4/1959 | Bush et al. | 195/7 |
| 3,862,003 | 1/1975 | Okuyama et al. | 195/7 |

Primary Examiner—Lionel M. Shapiro

[57] ABSTRACT

An improved method of tempering frozen heparin-bearing animal tissue is disclosed wherein the frozen tissue is particulated, thawed and warmed in a heat exchanger and fermented at temperatures ranging from about 60°–85° F. for 5–12 hours. Putrefaction and odor are avoided; the tissue has improved uniformity in biochemical content and is capable of high heparin yields when processed according to known procedures. When the tempered tissue is defatted with an azeotropic solvent, more of the fat is removed and the defatted tissue is more permeable to heparin recovery solutions and heparin isolation is facilitated.

8 Claims, No Drawings

PROCESS FOR TEMPERING TISSUE FOR HEPARIN PRODUCTION

BACKGROUND OF THE INVENTION

The present application is a continuation-in-part application of copending application Ser. No. 743,373 filed Nov. 19, 1976 now abandoned, which was a continuation-in-part application of copending application Ser. No. 627,807 filed Oct. 31, 1975, now abandoned. Copending application Ser. No. 693,651 filed Apr. 5, 1978, which is a continuation-in-part application of copending application Ser. No. 743,385 filed Nov. 19, 1976 now abandoned discloses a process which utilizes the process of this invention.

This invention relates to an improved method of tempering animal tissue for heparin production. More particularly, this invention relates to an improved process for raising the temperature of frozen heparin-bearing animal tissue under controlled conditions of temperature and time in preparation for isolation of heparin. The tissue is first particulated, as by grinding, chopping or other means, while in a frozen or partially frozen state, thawed and warmed in a heat exchanger and thereafter fermented by the action of endogenous enzymes and bacteria at 60° to about 85° F. for 5 to 12 hours but not substantially beyond the time severe foaming or gassing begins. The resulting tempered tissue may be defatted and dehydrated with a solvent which forms an azeotrope with the tissue water and subjected to a heparin recovery procedure or it may be used directly in heparin recovery processes.

Heretofore, frozen heparin-bearing animal tissue was tempered by allowing solidly frozen blocks of the tissue in bags or boxes to gradually thaw and warm up over periods of 2 to 8 days at ambient temperature of 60°-120° F. while in these containers, during which time it had been thought that optimal conditioning of the tissue for heparin release in subsequent heparin recovery was occurring. However, the tissue is very sensitive to enzymatic action and subject to decomposition by undesirable bacterial growth and rotting of tissue. The outside of a frozen block of tissue subjected to these older tempering methods could actually putrefy before the interior had reached a thawed state. This resulted in generation of obnoxious, undesirable odors which, curing the 2-8 day period, would spread throughout the community surrounding the tempering plant. This long period of time required for tempering resulted in poor utilization of space with consequent high overhead expense, bloody fluid and sewage disposal problems, and tempered tissue which was not sufficiently uniform biochemically from one lot to another due to non-uniform tissue breakdown resulting in heparin unavailability and consequent need for continual adjustment during later processing in heparin isolation. In addition, unwanted bacterial decomposition is known to cause high pyrogen content and increased effort was required for pyrogen removal.

Moreover, when tissues tempered by the above-described prior art procedures were particulated and subjected to azeotropic solvent processing to remove fat and water, the fat content was not lowered below about 0.5% by weight even under the most favorable circumstances and more generally ranged from 1.0 to 2.0%. In addition, the defatted-dehydrated tissue particles were difficult to wet and floated for long periods of time in conventional solutions used in the initial step of the heparin recovery process and in the mixtures were difficult to handle and filter subsequently in the process. Tissue tempered according to the present invention is capable of conversion to desiccated and defatted tissue of unusually high quality by azeotropic processing wherein the fat content is generally reduced to about 0.1 to 0.3 weight % and the product is readily wetted in the above described heparin recovery process and mixtures are more easily filtered. Other indications of improved quality of such defatted tissues are lighter color, less odor, good texture and homogeneity as well as consistent low levels of fat and residual solvent. In addition, more fat is recoverable from the solvent for a given amount of heparin-bearing tissue which is an advantage. Apparently the novel combination of steps in the present process of particulating frozen tissue, rapidly thawing and warming the tissue and fermenting under controlled conditions is responsible for the increased wettability. Further and equally important, due to the control of conditions during tempering, the heparin yield and content of the defatted tissue having been first tempered by the process of this invention can be as much as about 10-12% higher than for the above-described prior art defatted tissue.

M. H. Kuizenga in U.S. Pat. No. 2,410,084 discloses dispersing animal tissue in at least 15% added water, raising the temperature of the mixture for a short period of time to a first elevated temperature of 86°-122° F., preferably at least 96° F. and thereafter autolyzing the mixture for conventional time periods, e.g., 24 hr. Putrefaction is inhibited by adding xylene. Total assay units of heparin ranged from 845,000 to 1,032,000 for an average of 850,000 units per 100 lb. of starting tissue. While the method of the foregoing patent was an improvement over earlier conventional methods described by A. F. Charles and D. A. Scott in Trans. Royal Society of Canada, Sec. 5 pp 55-85 (1934), the method of the present invention in which no water and no preservatives are added represents an even greater advance in that on average about 50% more assay units of heparin are recovered than were recovered by Kuizenga. In the present invention there is no requirement to heat to a first elevated temperature of 86°-122° F., maximum heparin yields being obtained from tissue fermented at temperatures as low as 70°-75° F., which temperatures did not exceed 70°-75° F. at any time during warm-up and fermentation. The process of the present invention also eliminates the expense of adding and recovering xylene. Holding time for fermentation is also greatly reduced resulting in time savings and space economy in the fermentation vessel.

When the conditioned product of the present process is further processed via defatting-dehydration with azeotropic solvent such as ethylene dichloride (EDC), any added water requires eleven pounds of EDC to azeotrope each pound of water for at least an energy requirement of 2,540 BTU. Thus, comparing the present process which uses no water to the foregoing prior art method, for 100 lb. of starting tissue mixed with 15 lb. of water, the net savings in energy is at least 38,100 BTU.

U.S. Pat. No. 2,954,321 outlines difficulties associated with attempts to control bacterial development of pyrogens and putrefaction with accompanying odor problems.

Bacteriostats are said to reduce heparin yield, since the bacteria are apparently essential for maximum yields in the autolysis procedure. Attempts to carefully control reaction conditions to control bacterial population during autolysis are said also to reduce heparin yields. The present invention overcomes petrefaction while at the same time maximizing heparin availability be eliminating bacteriostats and water which allows free growth of bacteria and shorter fermentation time with less degradation of heparin and by following a strict regimen of temperature and time control in rapid thawing, warming and fermentation. As a result, unexpected superior yields of heparin are obtained.

As used herein the term "tempering" refers to raising the temperature of frozen heparin-bearing animal tissue and conditioning it for further heparin recovery processing. The term "heparin-bearing animal tissue" refers to those animal tissues rich in heparin and suitable for heparin production such as lung, brain, liver, intestines or inexpensive fleshy parts of animals. The term "particulate" or derivatives thereof pertains to the divided state of the tissue; i.e., size up to about ¼ inch mesh, or the act of dividing larger pieces which have been pre-broken or flaked. The term "fermentation" refers to the combined action of endogenous enzymes and endogenous bacteria present in the tissue. By "endogenous bacteria" is meant those bacteria present as a normal tissue population and due to multiplication during fermentation. By "endogenous enzyme" is meant enzymes present initially in the tissue and those produced by endogenous bacteria during fermentation. The term "azeotropic processing" refers to the subjection of the tissue to the boiling action of a solvent which forms an azeotrope with water to substantially remove it and which extracts tissue fat into the solvent stream and thereafter collecting and washing the dehydrated tissue on a filter with solvent.

SUMMARY OF THE INVENTION

The present invention therefore resides principally in the discovery that improved tempering of frozen or partially frozen heparin-bearing animal tissue can be effected by particulating and pumping to a heat exchanger where, under controlled conditions, it is thawed and warmed and thereafter fermented within a specific temperature range of 60° to 85° F. for a period of time of 5 to 12 hours to substantially effect enzymatic conditioning of the tissue to improve heparin availability. The process provides improved biochemical uniformity from one lot to another, exceptionally high availability of heparin due to control of time and temperature throughout the processing of each lot, and conditioned tissues which are comparatively low in pyrogen content.

The preferred process comprises grinding frozen or partially frozen tissue and rapidly thawing and warming the thawed tissue in a heat exchanger and thereafter fermenting the tissue at temperatures within the range of about 60° to 85° F. for a period of time to optimize heparin availability, length of time required being dependent on temperature. No water in addition to tissue water is required either in thawing the tissue or in the fermentation step. No preservative of any kind is added as the growth of favorable bacteria is essential and must be promoted during fermentation. No enzymes or bacteria additional to the endogenous enzymes and bacteria are added. Generally speaking, the higher the temperature within this range the shorter will be the time required. For some unexplained reason, severe evolution of gas and foaming signals the end of the desirable fermentation phase.

The heparin in the tissue tempered as in this invention may be recovered by a number of techniques including the method of U.S. Pat. No. 2,797,184. The tempered product may be dehydrated and defatted first by azeotropic processing procedures such as in U.S. Pat. No. 2,539,544 to provide a solid heparin source which is exceptionally low in fat and readily wetted by solutions used in heparin separation such as are described in U.S. Pat. Nos. 2,797,184 or 2,954,321 with superior recovery of heparin obtained as compared with conventionally tempered tissue which has also been defatted by azeotropic means.

It is therefore an object of the present invention, generally stated, to provide an improved process for tempering frozen heparin-bearing animal tissue prior to heparin recovery and isolation procedures, particularly wherein the process eliminates the unsanitary conditions of rotting and obnoxious odor which are attendant in prior art methods.

Another object of the present invention is to provide a process for tempering frozen heparin-bearing animal tissue under controlled conditions as to precise time and temperature at all times including a controlled fermentation step wherein the total endogenous microbiological population is evenly distributed in the substrate and their growth promoted allowing also the action of endogenous enzymes present to act on the substrate, which produces a uniformly conditioned product having a more consistent biochemical content, which is lower in pyrogen content and high in available heparin content, and which may be advantageously employed to prepare a dehydrated and defatted heparin tissue by azeotropic processing exceptionally low in fat content and easily wetted and easily suspended in liquid involved in heparin recovery processing.

Certain other and more specific objects will in part become apparent to artisans and will in part appear hereinafter from a more detailed description of the best mode of carrying out the invention and the examples which follow.

DETAILED DESCRIPTION OF THE INVENTION

The preferred process of the present invention for tempering frozen heparin-bearing tissue without added water or preservatives in preparation for isolation and recovery of heparin comprises the steps of (1) particulating the frozen tissue to any size up to about ¼ inch mesh size, preferably ⅛ to ¼ inch mesh size, preferably using a grinder, (2) thawing and warming the particulated tissue from step 1 in the absence of added water or preservatives within 2 to 30 minutes time to a temperature within the range of about 60° to 85° F., preferably 70° to 85° F., using a heat exchanger, preferably a shell and tube heat exchanger, and (3) fermenting the warmed tissue from step 2 in the absence of added water or preservatives by spontaneous action of enzymes and bacteria endogenous to the tissue, no additional enzymes or bacteria being required, by holding it at a temperature within the range of about 60° to 85° F. for a period of 5 to 12 hours, preferably 70° to 85° F. for a period of 6 to 8 hours, to substantially effect enzymatic conditioning to maximize heparin availability but not substantially beyond the time foaming starts due to gas liberation.

The heparin-bearing animal tissue for the process of this invention originates at the meat packing plant where it is cut from animal carcasses and handled according to specified procedures for preserving and enhancing heparin values, boxed or bagged and deep frozen. As a consequence, the animal parts arrive at the heparin recovery plant as blocks of one kind of frozen, agglomerated animal part such as, for example, lung in the size and shape of the containers. Usually, the size of the blocks of frozen animal parts is too large for direct grinding in the size grinder feasible for this art and it is therefore necessary to reduce the size of the blocks by some means prior to feeding to a grinder. To accomplish this the deep-frozen blocks of tissue may be cracked or prebroken mechanically in a device known as a Prebreaker TM. Preferably, however, the blocks of tissue are partially defrosted for about 8 hours at ambient temperatures of 80°–100° F. and thereby brought from their deep-frozen state to a softer state by raising the temperature of the blocks to about 20°–32° F. after which time the softened tissue may be chipped or flaked in preparation for grinding. When the flaking or chipping procedures are followed the preferable temperature to which the blocks of tissue are raised is about 26° F. as the tissue is rigid enough to be flaked, yet in a somewhat softened condition feasible for the flaking operation. A suitable flaking machine is the Hydrauflaker TM produced by the General Machinery Corp., Sheboygan, Wis. In any case, the tissue should not be so cold that the ground tissue in the next step refreezes into balls and clumps which prevent pumping. In general, the particle size of prebroken or flaked frozen tissue can vary from ⅛ inch to 2 inches in diameter.

In step 1 of the process, grinders operate to reduce the size of the prebroken or flaked, frozen or partially frozen tissue to that ranging from that present in a puree up to a maximum dimensional mesh size of about ¼ inch, preferably up to ⅛ inch mesh size. No water is added. Grinders which are suitable are the Comitrol TM produced by Urschel Laboratories of Valparaiso, Ind. and the Autio Grinder produced by the Autio Company, Astoria, Ore.

In step 2, the ground-frozen or partially-frozen tissue is introduced by means of a pump such as a Moyno TM pump to a heat exchanger which operates to thaw and warm the tissue in 30 minutes or less, preferably within about 8 minutes, to about 60° to 85° F., preferably 70°–85° F. using a heat exchange surface temperature not to exceed 140° F. No water is added. Above about 30 minutes too much variation is introduced in later processing. Heat exchange surfaces having a higher temperature than 140° F. cause fouling of the surfaces, denaturing of protein and microbiological kill-off. Shell and tube heat exchangers with tissue passing through the tube are highly satisfactory and preferred but wiped surface heat exchangers may be also used. The preferred shell and tube heat exchangers will range in tube size of about ¾ inch diameter to about one inch in diameter and will consequently have surface to volume ratios of about 50–75 ft.² per ft.³. Surfaces of tubes in this size range remain unfouled. Alternately, the tissue may be thawed and warmed partially in the heat exchanger and then warmed to 60°–85° F. by other means, total thawing and warming time not exceeding 30 minutes.

In step 3, the warm tissue having no added water or preservatives and no added enzymes or bacteria is held in a vessel having an inert surface such as a stainless steel tank at a temperature of about 60° to 85° F. for a period of time sufficient to condition the tissues as a result of a fermentation involving enzymes already present and enzymes produced by growing endogenous microorganisms. Preferably, the tissue is held at 70°–85° F. for 6 to 8 hours time. Above 85° F., heparin values are rapidly lost due to growth of thermophilic bacteria and the fermentation is more difficult to control due to variations in speed of growth of desirable bacteria and the possible overgrowth of the more thermophilic bacteria. Additionally, when the tissue is fermented above 85° F., pumping of fermented tissue from the fermentation vessel to heparin recovery becomes virtually impossible to accomplish in short periods of time required due to gas development. Below about 60° F. undesirable microorganisms such as molds may grow and which have a deleterious effect as well as giving unpredictable heparin yield in further processing. Five to 12 hours fermentation time is required at 60° to 85° F. and for some unknown reason the completion of the beneficial fermentation is signaled by severe gas liberation and rising in the holding tanks and further fermentation decreases the yield of heparin. The holding period should be terminated then or just preceding this indicator according to previous experience as to time requirement for a particular temperature. Illustrative of the time temperature relationship are the following coordinates obtained by trial and error at which the frothing or gassing phase had begun.

| Time, hr. | Temp., °F. |
|---|---|
| 11–12 | 60 |
| 9–10 | 75 |
| 8 | 80 |
| 6 | 85 |
| 4 | 90 |

It is not necessary to wait until gassing occurs to obtain the superior product of this invention. Generally, there is some variation of microorganisms in lung tissue taken from individual animals; however, grinding and mixing of hundreds of lung lobes assures that the fermentation will eventually proceed.

The conditioned product of this invention is ideally suited for use in azeotropic desiccating and defatting processes to further enhance heparin availability and separation such as are disclosed in U.S. Pat. Nos. 2,619,425 and 2,539,544. Preferably, the azeotropic dehydrating-defatting operation is conducted at atmospheric pressure using ethylene dichloride at a temperature not exceeding 180° F. Defatting tissue so obtained is characterized by its low fat content of about 0.1 to 0.3 weight % and by excellent permeability as measured by wettability and suspendability.

The following are specific examples of the process of this invention.

EXAMPLE 1

(Improved Method)

Partially defrosted frozen beef lung at 25°–30° F. in amount of 15,190 lbs. was flaked using a Hydrauflaker TM (Model FS-6) to a size range of ⅛ inch to ¼ inch thick and up to 4 inches long. The flaked frozen lung was then ground with a Comitrol TM Grinder (Model 2100) having 0.06 inch size opening. The ground frozen or partially frozen lung was pumped with a Moyno TM pump through ¾ inch diameter tubes of a shell and tube heat exchanger to thaw and warm the lung to 68°–73° F., residence time in the heat exchanger being about 4 minutes. The warm ground lung was then held in a stainless steel tank for 6 hours at 70°–75° F. No external heat was needed to maintain the temperature during the fermentation and a slight rise in temperature due to heat of reaction was also noted, but the temperature did not exceed 75° F. at any time. There was obtained about 15,000 lbs. of tempered lung suitable for heparin recovery processing. No undesirable odor was present during the processing.

EXAMPLE 2

Partially defrosted frozen beef lung at 26° F. in amount of 16,200 lbs. was flaked and ground as in Example 1, but using 0.120 inch openings on the grinder. The ground lung was thawed and warmed to 83° F. in a heat exchanger as in Example 1, residence time in the heat exchanger being about 4 minutes. The warm ground lung was then held in a stainless steel tank for 5 hours at 83°–85° F. No undesirable odor was present during the processing. There was obtained 15,800 lbs. of tempered lung suitable for heparin recovery processing.

EXAMPLE 3

Frozen beef lung (12,000 lbs.) at 25°–30° F. was flaked and ground as in Example 1 and thawed and warmed to 40°–50° F., residence time being about 2 minutes in the heat exchanger. The ground lung was held at 40°–52° F. for 6 hours. There was obtained about 11,900 lbs. of tempered beef lung.

EXAMPLE 4

Frozen beef lung (12,000 lbs.) at 25°–30° F. was flaked and ground as in Example 1 and thawed and warmed to 90°–110° F. in the heat exchanger. The warm, ground lung was held at 90°–110° F. for 6 hours. There was obtained about 11,900 lbs. of tempered beef lung.

EXAMPLE 5

Frozen lung (16,200 lbs.) at 26° F. was flaked and ground as in Example 1 and thawed and warmed to 79° F. in the heat exchanger. The warm, ground lung was held at 79°–80° F. for 8 hours. There was obtained 15,850 lbs. of tempered beef lung.

AZEOTROPIC EXTRACTION OF TEMPERED TISSUE

The tempered lung product prepared in Examples 1 to 5 were separately subjected to azeotropic distillation and extraction with ethylene dichloride at atmospheric pressure, collected on a filter, washed with ethylene dichloride and dried to remove residual ethylene dichloride. The dried and defatted lung products were processed for their heparin contents by a modified but comparable procedure of U.S. Pat. No. 2,410,084. Units of heparin are U. S. P. units. Comparative data are in Table 1.

Table 1

| | Lung Fermentation, Extraction and Heparin Isolation | | | | |
|---|---|---|---|---|---|
| | Fermentation Conditions | | % Yield of Dried Defatted | % Fat in Dried Defatted | Crude Heparin Yield | Heparin Potency |
| Ex. No. | Temp, °F. | Time, hr. | Lung (a) | Lung | (b) | (c) |
| 1 | 70–75 | 6 | 18.4 | 0.18 | 158 | 79 |
| 2 | 85 | 6 | 17.4 | 0.30 | 153 | 59 |
| 3 | 40–50 | 6 | 17.1 | 0.12 | 164 | 48 |
| 4 | 90–110 | 6 | 13.9 | 0.08 | 86 | 74 |

Table 1-continued

| | Lung Fermentation, Extraction and Heparin Isolation | | | | |
|---|---|---|---|---|---|
| | Fermentation Conditions | | % Yield of Dried Defatted | % Fat in Dried Defatted | Crude Heparin Yield | Heparin Potency |
| Ex. No. | Temp, °F. | Time, hr. | Lung (a) | Lung | (b) | (c) |
| 5 | 80 | 8 | 18.0 | <0.2 | 155 | 96 |

(a) wt. % based on starting lung.
(b) Units (b) Units heparin × 10³/kg. desiccated and defatted lung.
(c) units per mg. in crude heparin.

Total assay units of heparin made available within the scope of the process of the present invention per 100 lb. of starting lung as exemplified are given in Table 2 and are determined by calculation from the data of Table 1 as illustrated for Example 1 as follows.

$$\text{Units Heparin per 100 lb. Starting Raw Lung} = 18.4 \text{ lb.} \times 0.45359 \text{ kg*/lb} \times 158 \times 10^3 \text{ units/kg.}$$
$$= 1,319,000 \text{ units heparin}$$

*Conversion factor kg. per lb.

Table 2

| Example | Total Units per 100 lb. Starting Lung |
|---|---|
| 1 | 1,319,000 |
| 2 | 1,204,000 |
| 5 | 1,237,000 |
| | 1,253,000 Avg. |

In comparison, the assay units of heparin obtained by Kuizenga in U.S. Pat. No. 2,410,084, which processing was conducted with water and preservative, averaged 850,000 units per 100 lb. starting lung. See also J. Biol. Chem. 148: 641-7 (1943) wherein the foregoing average is given using the data of U.S. Pat. No. 2,410,084.

Thus, the availability assay of heparin demonstrated in the Examples of the present invention is on average approximately 50% greater than that obtained by Kuizenga and approximately 3.5 times that reported by Charles & Scott, Tr. Roy. Soc. Canada Sect. 5, 28, 55 (1934).

COMPARISON OF WETTABILITY OF TEMPERED-DESICCATED AND DEFATTED TISSUE

Comparison of wettability was made of azeotropically defatted tissue prepared from tissue tempered by the new improved process of this invention with that of the defatted tissue prepared from tissue tempered by the old method, wherein the lung was tempered about 4 days at ambient temperature of 80°–100° F. and no water having been added. For this comparison, a 20 gram sample of the defatted product was stirred in 200 ml. water until particles appeared wet on the outside and the stirring stopped. The time required for the bulk of the particles to sink was then recorded. Data are in Table 3.

Table 3

| Wettability Comparison | |
|---|---|
| Method of Tempering | Time For Particles to Sink to Bottom seconds |
| Old | >180 |

Table 3-continued

| Wettability Comparison | |
|---|---|
| Method of Tempering | Time For Particles to Sink to Bottom seconds |
| New | < 10 |

What is claimed is:

1. A process for tempering frozen heparin-bearing animal lung tissue without addition of water, preservatives or enzymes in preparation for isolation of heparin and to maximize heparin availability which comprises the steps of
    (1) particulating said lung tissue,
    (2) thawing and warming the particulated tissue from step 1, without added water or preservatives, in a heat exchanger and warming said lung tissue to 60°–85° F. within 2 to 30 minutes time using heat exchanger surfaces which do not exceed 140° F. and
    (3) fermenting the warmed lung tissue from step 2 without added water or preservatives by spontaneous action of enzymes and bacteria endogenous to the tissue, no additional enzymes or bacteria being added, by holding it at a temperature within the range of about 60° to 85° F. for a period of 5 to 12 hours to substantially effect enzymatic conditioning of said tissue to maximize heparin availability.

2. A process of claim 1 wherein the animal lung tissue is beef lung.

3. A process of claim 1 wherein in step 2 the tissue is warmed to 70°–85° F. and in step 3 the lung tissue is held at a temperature of 70°–85° F. for 6 to 8 hours.

4. A process of claim 1 wherein in step 2 the lung tissue is thawed and warmed to said temperature in 2 to 8 minutes.

5. A process of claim 1 wherein the step 2 the heat exchanger is a shell and tube heat exchanger, said lung tissue being moved through the tube.

6. A process for tempering frozen lung tissue without addition of water, preservatives or enzymes in preparation for isolation of heparin and to maximize heparin availability which comprises the steps of
    (1) particulating said lung tissue,
    (2) thawing the particulated lung tissue in a heat exchanger and warming said tissue without added water or preservatives to 70°–85° F. within 2 to about 8 minutes using heat exchanger surface temperatures which do not exceed 140° F. and
    (3) fermenting the warmed lung tissue from step 2, without added water or preservatives, by spontaneous action of enzymes and bacteria endogenous to lung tissue, no additional enzymes or bacteria being added, by holding said tissue at a controlled temperature of 70°–85° F. for a period of time of 6 to 8 hours to substantially effect conditioning of said tissue to improve heparin availability, endogenous bacteria being allowed to grow without inhibition during said period of time.

7. A process of claim 6 wherein the lung tissue is beef lung.

8. A process of claim 6 wherein in step 2 the heat exchanger is a shell and tube heat exchanger, said tissue being moved through the tube.

* * * * *

UNITED STATES PATENT AND TRADEMARK OFFICE
CERTIFICATE OF CORRECTION

PATENT NO. : 4,188,467

DATED : Feb. 12, 1980

INVENTOR(S) : William E. Melby; Charles E. Isdale, Sr.; Vernon K. Collins

It is certified that error appears in the above-identified patent and that said Letters Patent are hereby corrected as shown below:

Column 1, line 11, change Serial No. "693,651" to read --893,651--

Signed and Sealed this

Tenth Day of June 1980

[SEAL]

Attest:

SIDNEY A. DIAMOND

Attesting Officer

Commissioner of Patents and Trademarks